US012802184B1

(12) United States Patent
Safran

(10) Patent No.: US 12,802,184 B1
(45) Date of Patent: Nov. 17, 2026

(54) CALIBRATION TARGET AND METHOD FOR DISTORTION CALIBRATION

(71) Applicant: See All AI Inc., Nashua, NH (US)

(72) Inventor: Moshe Safran, Nashua, NH (US)

(73) Assignee: See All AI Inc.

( * ) Notice: Subject to any disclaimer, the term of this patent is extended or adjusted under 35 U.S.C. 154(b) by 0 days.

(21) Appl. No.: 19/417,609

(22) Filed: Dec. 12, 2025

Related U.S. Application Data

(60) Provisional application No. 63/916,045, filed on Nov. 12, 2025, provisional application No. 63/916,010, filed on Nov. 12, 2025.

(51) Int. Cl.

*G06T 5/80* (2024.01)
*G06T 3/18* (2024.01)
*G06T 7/80* (2017.01)

(52) U.S. Cl.

CPC .................. *G06T 5/80* (2024.01); *G06T 3/18* (2024.01); *G06T 7/80* (2017.01)

(58) Field of Classification Search

CPC ................ G06T 5/80; G06T 3/18; G06T 7/80
See application file for complete search history.

(56) References Cited

U.S. PATENT DOCUMENTS 8,232,798 B2 7/2012 Krueger et al.
9,455,539 B1 9/2016 Axelowitz et al.
10,010,372 B1 7/2018 Beck
10,258,414 B2 4/2019 O'Grady et al.
10,390,843 B1 8/2019 Henderson
10,709,394 B2 7/2020 Zhou et al.
10,839,543 B2 11/2020 Cheng et al.
11,207,135 B2 12/2021 Schmidt et al.
11,379,985 B2 7/2022 Wang et al.
12,039,685 B2 7/2024 Lavi et al.
12,245,825 B2 3/2025 Harris et al.
12,361,631 B2 7/2025 Gregerson
12,383,219 B2 8/2025 Kovler et al.
12,444,127 B2 10/2025 Gregerson (Continued)

FOREIGN PATENT DOCUMENTS

JP 2002-336237 A 11/2002
WO 2023/186996 A1 10/2023

OTHER PUBLICATIONS

Gronenschild, "Correction for geometric image distortion in the x-ray imaging chain: Local technique versus global technique", 1999, Am. Assoc. Med. Phys., 26, 2602-2616 (Year: 1999).*

(Continued)

*Primary Examiner* — Oneal R Mistry
*Assistant Examiner* — Justin Philip Cascais
(74) *Attorney, Agent, or Firm* — ArentFox Schiff LLP; Shawn P. Foley, Esq.

(57) ABSTRACT

A calibration target for use with a radiographic image detector provides rich geometric constraints for imaging distortion correction using linear markers with intentional gaps that yield discrete node features while minimizing scene occlusion. Also disclosed is a method to calibrate geometric distortion in imaging systems by jointly fitting a smooth two-dimensional warp and auxiliary link functions using both sparse node correspondences, e.g., gap centers and/or intersections from a target, and dense line-scan samples, e.g., pixel traces of known horizontal/vertical lines.

27 Claims, 7 Drawing Sheets

(56) References Cited

U.S. PATENT DOCUMENTS

| | | | |
|---|---|---|---|
| 12,462,469 B2 | 11/2025 | Gregerson | |
| 2003/0130576 A1 | 7/2003 | Seeley et al. | |
| 2004/0015077 A1 | 1/2004 | Sati et al. | |
| 2005/0117708 A1 | 6/2005 | Cho et al. | |
| 2005/0159759 A1 | 7/2005 | Harbaugh et al. | |
| 2008/0285843 A1 | 11/2008 | Lim | |
| 2009/0207971 A1 | 8/2009 | Uhde et al. | |
| 2009/0285366 A1 | 11/2009 | Essenreiter et al. | |
| 2010/0249800 A1 | 9/2010 | Kim et al. | |
| 2010/0312103 A1 | 12/2010 | Gorek et al. | |
| 2011/0255661 A1 | 10/2011 | Schweizer | |
| 2012/0236993 A1 | 9/2012 | Graumann | |
| 2013/0170627 A1 | 7/2013 | Topfer et al. | |
| 2014/0285676 A1* | 9/2014 | Barreto ................ | H04N 17/002 348/333.08 |
| 2016/0242724 A1 | 8/2016 | Lavallee et al. | |
| 2017/0156800 A1 | 6/2017 | Brown | |
| 2018/0315221 A1 | 11/2018 | Jones et al. | |
| 2018/0315243 A1 | 11/2018 | Mahler et al. | |
| 2019/0216409 A1 | 7/2019 | Zhou et al. | |
| 2020/0085404 A1 | 3/2020 | Siewerdsen et al. | |
| 2020/0222018 A1 | 7/2020 | Van et al. | |
| 2020/0359988 A1 | 11/2020 | Woods et al. | |
| 2021/0113176 A1 | 4/2021 | Sehnert et al. | |
| 2021/0169504 A1 | 6/2021 | Brown | |
| 2021/0192810 A1 | 6/2021 | Paysan et al. | |
| 2022/0020215 A1 | 1/2022 | Banerjee et al. | |
| 2022/0031423 A1 | 2/2022 | Halpert | |
| 2022/0313288 A1 | 10/2022 | Janardhan et al. | |
| 2024/0185509 A1 | 6/2024 | Kovler et al. | |
| 2024/0320829 A1 | 9/2024 | Kimmel et al. | |
| 2024/0402369 A1 | 12/2024 | Isham et al. | |
| 2025/0186014 A1 | 6/2025 | Gregerson | |

OTHER PUBLICATIONS

Jecklin et al., "Domain Adaptation Strategies for 3D Reconstruction of the Lumbar Spine Using Real Fluoroscopy Data", Medical Image Analysis, vol. 98, Aug. 22, 2024, pp. 1-19.

Jecklin et al., "X23D-Intraoperative 3D Lumbar Spine Shape Reconstruction Based on Sparse Multi-View X-ray Data", Journal of Imaging, vol. 8, No. 10, Oct. 2, 2022, pp. 1-18.

International Search Report and Written Opinion received for PCT Patent Application No. PCT/US2025/059321, mailed on May 7, 2026, 14 pages.

Corrected International Search Report and Written Opinion received for PCT Application No. PCT/US2025/059321, mailed on Jul. 6, 2026, 20 pages.

* cited by examiner

CALIBRATION TARGET AND METHOD FOR DISTORTION CALIBRATION

CROSS-REFERENCE TO RELATED APPLICATIONS

This application claims priority to U.S. Provisional Application No. 63/916,045 filed Nov. 12, 2025, entitled Calibration Target For Distortion Correction With Gapped Line Markers And Orientation Encoding, and U.S. Provisional Application No. 63/916,010 filed Nov. 12, 2025, entitled System And Method For Distortion Calibration Using Polynomial Warp And Link-Function Constraints From Nodes And Line Scans, the disclosures of which are incorporated herein by reference in their entirety for all purposes.

FIELD OF THE DISCLOSURE

This disclosure relates to medical image processing and surgical navigation, and, in particular, to a system and method for geometric calibration and distortion correction for imaging systems.

BACKGROUND OF THE DISCLOSURE

In medical imaging, precise calibration of radiographic imaging systems is essential for accurate reconstruction of three-dimensional (3D) volumes from two-dimensional (2D) projections. Mobile C-arm systems are widely used in interventional radiology and surgical navigation due to their flexibility and mobility. However, accurate calibration of these systems remains a significant challenge, particularly when aiming for high-precision 3D reconstructions using a limited number of radiographic images.

Traditional calibration methods for C-arm systems often employ calibration targets consisting of small spherical radiopaque markers (e.g., ball bearings or BBs) of various sizes and depths embedded within a calibration object. While these markers are effective for detecting precise 2D positions in radiographic images, however, they introduce challenges when the images are used for back projection in 3D volume reconstruction. The spherical markers occupy multiple pixels in the image, complicating digital subtraction and potentially degrading the quality of the reconstructed volume. Moreover, the presence of these markers can introduce artifacts and interfere with the imaging of anatomical structures. In addition, spherical marker targets are difficult to manufacture accurately and require embedding markers within machined rigid foam and precise measurement of each marker's 3D location using specialized equipment like coordinate measuring machines (CMMs). This process is time-consuming, expensive, and results in heavy, bulky targets.

Traditional dot/checkerboard targets provide discrete points but may lack intrinsic orientation encoding and can occlude large image areas if dense. Purely point-based calibration (e.g., checkerboards) can under-sample complex distortions unless the point set is dense. Purely line-based (plumb-line) approaches lack absolute 2D anchoring and can be unstable for strong distortions.

Accordingly, a need exists for a calibration target that supplies continuous lines for dense shape, gaps for many discrete nodes, and an orientation cue—while remaining sparse to minimize occlusion—improves calibration reliability and automation.

A further need exists for a method and system that simplifies the detection and localization of calibration features in 2D radiographic images.

A still further need exists for a method and system that facilitates easy digital subtraction of calibration features from the images post-calibration.

An even further need exists for a method and system that enhances the accuracy of camera calibration by providing precise 2D to 3D point correspondences.

An even further need exists for a method and system that captures and corrects image distortions inherent in radiographic imaging systems, especially image intensifier systems.

An even further need exists for a method and system that simplifies manufacturing and improves robustness of the calibration target.

An even further need exists for a method and system that improves the calibration process for radiographic imaging systems used in reconstructing 3D CT volumes from bi-support radiographic images.

An even further need exists for a unified method that fuses the absolute reference of nodes with the shape richness of line scans, in a numerically stable formulation that scales to higher order distortions.

SUMMARY OF THE DISCLOSURE

The disclosed calibration target apparatus provides rich geometric constraints for imaging distortion correction using linear markers with intentional gaps that yield discrete node features while minimizing scene occlusion. A support body carries multiple substantially straight elongated markers arranged (e.g., orthogonal sets) across a field. Gaps at predetermined positions, together with line intersections, define a dense set of fiducial node locations known in the target's reference frame. At least one orientation-reference marker differs from other markers, e.g., no gaps, unique gap code, or greater thickness, to disambiguate rotation and mirror flips in a captured image. Embodiments include radiopaque implementations, e.g., copper traces on PCB, for X-ray systems, mounting features for C-arm detectors, and visual implementations for optical cameras.

Specifically, the disclosed system comprises a support body bearing multiple elongated markers laid out as substantially straight lines. Intentional gaps in the markers define many node features (gap centers/endpoints and intersections). An orientation-reference marker, e.g., gap-free line, unique gap pattern, or thicker line, provides clocking to resolve flips/rotations. Embodiments include radiopaque PCB constructions for X-ray, e.g., copper traces, visual ink/metal on transparent carriers for optical, multi-layer layouts to allow crossings, and mounting features to register the target to a detector housing. Preferred gap placement is uniform with intersection exclusion, but randomized or basis-optimized patterns are also disclosed.

According to one aspect of the disclosure, a calibration target apparatus for use with a radiographic image of an imaging system, the calibration target comprises: a target frame securable to a radiographic image detector, the target frame defining an interior passage; and a plurality of at least partially radiopaque markers, each marker having a fixed position relative to the target frame and transversing the interior passage so as to at least partially obstruct passage of radiation through the internal passage of the target frame; wherein each of the at least partially radiopaque markers defines a visually discernable linear pattern, and wherein less than all of the plurality of markers define a similar visually discernable linear pattern. In embodiments, one of the plurality of markers has an observable thickness dimension different from others of the radiopaque markers. In embodiments, one of the plurality of marker defines a solid line pattern without gaps. In embodiments, one of the plurality of marker defines a substantially straight line pattern with a plurality of gaps at predetermined positions. In embodiments, one of the markers has a gap spacing pattern that is unique relative others of the markers. In embodiments, two or more of the plurality of marker are arranged so that their respective patterns intersect. In embodiments, gaps within respective patterns of intersecting markers are placed with approximately uniform spacing while excluding points of marker intersections. In embodiments, at least a portion of the gaps of one or more of the plurality of marker defined randomized or basis optimized patterns. In embodiments, i) a point of intersection between two or more of the plurality of markers, and ii) locations of gaps within the respective patterns of the intersecting markers jointly define a plurality of fiducial node positions in a reference coordinate frame of the calibration target. In embodiments, the plurality of at least partially radiopaque markers are disposed on a support surface secured across the interior passage of the target frame. In embodiments, the support surface has first and second surfaces and comprises material substantially transparent to radiation incident thereon. In embodiments, the plurality of markers comprise linear paths carried on one of the first and second surfaces of the support surface. In embodiments, the support surface comprises a printed circuit board and the plurality of markers comprise traces formed on one of the first and second surfaces of the support surface. In embodiments, the traces comprise any of metal foil, printed ink, vapor deposited metal, or laser ablated coatings. In embodiments, a first set of the plurality of markers is formed on a first surface of the support surface and a second set of the plurality of markers is formed on a second surface of the support surface, enabling apparent visual intersection of the first and second sets of markers by the radiographic image detector, without contact occurring between the first and second sets of markers. In embodiments, a first set of the plurality of markers is formed on a first support surface secured across the interior passage of the target frame and a second set of the plurality of markers is formed on a second support surface secured across the interior passage of the target frame. In embodiments, each of the first support surface and second support surface comprise printed circuit boards and the plurality of markers comprise traces formed on one of the first and second support surfaces. In embodiments, a first set of the plurality of markers is formed on the first support surface and a second set of the plurality of markers is formed on the second support surface. In embodiments, a first of the plurality of radiopaque markers are positioned relative to the target frame at a first depth of the interior passage and a second of the plurality of radiopaque markers are positioned relative to the target frame at a second depth of the interior passage. In embodiments, at least one pair of the plurality of markers is arranged at non orthogonal angles to increase spatial diversity of fiducial node locations.

According to another aspect of the disclosure, a method of obtaining calibration data for distortion correction of an imaging system, comprises: A) positioning a calibration target within a field of view of an imaging detector, the calibration target comprising a frame and a plurality of at least partially radiopaque markers each defining a visually discernable linear pattern, and wherein less than all of the plurality of markers define a similar visually discernable linear pattern, B) capturing image data of the calibration target, the image depicting the visually discernable linear patterns of the plurality of at least partially radiopaque markers; and C) detecting, in the captured image data, fiducial node positions at intersecting points of the markers relative to the calibration target reference frame.

According to another aspect of the disclosure, a calibration target for geometric calibration of an imaging system, the target comprises: a support body providing a surface capturable by the imaging system; and a plurality of elongated markers disposed on the surface as substantially straight lines, each elongated marker including a plurality of intentionally absent segments (gaps) at predetermined positions, whereby the set of (i) intersections between the elongated markers and (ii) locations of the gaps jointly define a plurality of fiducial node positions predetermined in a reference coordinate frame of the target and detectable in a captured image. In embodiments, the calibration target comprises at least one orientation reference marker distinguished from other elongated markers by at least one of: a) absence of gaps; (b) a gap spacing pattern unique relative to other elongated markers; or (c) a different line thickness, thereby enabling disambiguation of a rotational and/or mirror orientation of the target in the captured image. In embodiments, the elongated markers comprise radiopaque line elements carried on a support surface so as to be visible in an X ray image. In embodiments, the support surface is a printed circuit board (PCB) and the radiopaque line elements comprise copper traces formed by lithographic or etching processes. In embodiments, the mounting features are configured to locate the target in a repeatable position relative to an imaging detector of an imaging system. In embodiments, the elongated markers comprise a first set of substantially parallel lines and a second set of substantially parallel lines oriented transversely to the first set to form a sparse grid across the surface. In embodiments, the orientation reference marker is distinguished by having a greater width than other elongated markers. In embodiments, the orientation reference marker is distinguished by having a gap spacing pattern that is unique relative to gap spacing patterns of the other elongated markers. In embodiments, at least one set of elongated markers is formed on a first surface of the surface and a transverse set on a second surface of the surface, enabling crossings without electrical contact. In embodiments, the gaps are placed with approximately uniform spacing while excluding neighborhoods of marker intersections. In embodiments, at least a portion of the gaps is placed according to a randomized or basis optimized pattern to reduce degeneracy. In embodiments, the support body is transparent and the elongated markers are visible contrast lines for optical imaging systems. In embodiments, the elongated markers are fabricated from any of metal foil, printed ink, vapor deposited metal, or laser ablated coatings. In embodiments, at least one pair of elongated markers is arranged at non orthogonal angles to increase spatial diversity of node locations. In embodiments, the support body and markers are sterilizable for use in operating room environments.

According to another aspect of the disclosure, a method of obtaining calibration data for distortion correction of an imaging system, comprises: positioning the calibration target of within a field of view of an imaging detector; capturing image data of the calibration target, the image depicting the elongated markers, the gaps, and the fiducial node positions; and detecting, in the captured image data, the positions of the fiducial node positions and, when present, the orientation reference marker, thereby producing calibration data for downstream processing. In embodiments, the imaging system is a C arm fluoroscopic X ray system and capturing comprises acquiring at least one X ray projection. In embodiments, the positioning comprises mounting the target directly on, or immediately in front of, the imaging detector using the mounting features. In embodiments, detecting the orientation reference marker comprises identifying a marker lacking gaps along substantially its entire length, or with a unique gap code, or with greater line thickness.

According to another aspect, this disclosure relates to medical image processing and surgical navigation, and, in particular, to a system and method for geometric calibration and distortion correction for imaging systems, using polynomial warp models constrained by both discrete nodes and dense line scans. Specifically, the disclosed systems and methods calibrate geometric distortion in imaging systems by jointly fitting a smooth two-dimensional warp and auxiliary link functions using both sparse node correspondences (e.g., gap centers and/or intersections from a target) and dense line-scan samples (e.g., pixel traces of known horizontal/vertical lines).

In embodiments, the forward warp F: $(x, y) \rightarrow (u, v)$ is modeled by total-degree-3 bivariate polynomials (or another selectable basis), and the link relation is a single, steerable, implicit surface $\phi(\tilde{u}, \tilde{v}; c, n_x, n_y)=0$ evaluated in coordinates projected along and orthogonal to each line, sharing one global parameter set across orientations. For axis-aligned lines, the simplified forms $v=H(u, y)$ and $u=G(x, v)$ may be used. A unified objective combines (i) node-fit residuals, (ii) warp-link coupling residuals, and (iii) link-vs-scan residuals with optional principled weighting (e.g., quadrature/Voronoi area with inverse-variance) and/or ridge regularization. An optional four-stage pipeline—affine seed, equality-constrained linear link solve, nonlinear warp recovery, and joint refinement with block-elimination of link parameters—yields accurate, stable calibration using few lines and many node cues with minimal image occlusion. The disclosed methods are illustrated for use with a calibration target attached to a radiographic imaging system, but are intended to be modality-agnostic (e.g., optical, X-ray, infrared). The calibration target disclosed in FIGS. 2-5 herein is suitable for use with the disclosed methods.

Disclosed is a joint warp plus link calibration framework that can be used to reduce distortion in images captured by an imaging system using a calibration target similar to that illustrated in FIGS. 2-5. The process begins with one or more images, e.g. X-rays, being captured by an imaging system using the calibration target device as described herein or similar. The resulting image includes a grid pattern of linear markers within the radiographic image. Next, co-ordinates of the grid nodes, e.g. gap centers and points of line intersection, are identified as a set of node correspondences between known reference coordinates and measured image coordinates. In embodiments, K high-accuracy nodes having the form of $\{(x_k, y_k) \rightarrow (u_k, v_k)\}$ are collected. Next, dense samples along the small number of known $y=y_i$ (horizontal) and $x=x_j$ (vertical) lines 40*a* and 40B are performed. Next, Forward Warp and Implicit Link Surfaces are modelled. Forward warp is modelled with $u(x, y)$, $v(x, y)$ as total-degree-3 polynomials (or any selectable basis). The Implicit Link surface is modelled with $\phi(\tilde{u}, \tilde{v}; c, n_x, n_y)=0$ (or axis-aligned reductions $H(u, y)$ and $G(x, v)$) (e.g. degree-3 polynomials or other selectable basis) encode per-line inverse behavior. Next, an objective is formed comprising a sum of squares (or other robust cost function) of node fit residuals, warp link coupling residuals, and link vs scan residuals, with optional quadrature/noise weighting; plus optional mild ridge on highest-order blocks.

Next, the warp and link parameters are optimized to minimize the objective, thereby producing a calibrated distortion model. In embodiments, such optimization enforces equality constraints requiring the link functions to interpolate node values. In embodiments, such optimization may be implemented with an optional four stage fitting pipeline comprising the acts of: (1) affine seed on nodes; (2) equality-constrained linear link solve on scans that enforces exact node anchors; (3) nonlinear warp recovery with links fixed; (4) joint refinement (e.g., Levenberg-Marquardt) with block-Schur elimination of link parameters.

According to one aspect of the disclosure, a method and computer program product for calibrating geometric distortion in an imaging system, comprises: A) receiving calibration data comprising (i) a set of node correspondences between known reference coordinates and measured image coordinates, and (ii) line-scan samples acquired along images of scene lines of known offset and orientation; B) selecting a parametric two-dimensional warp that maps reference coordinates to image coordinates and an auxiliary link function that relates v to (u,y) and u to (x,v); C) forming an objective comprising node-fit residuals, warp-link coupling residuals, and link-vs-scan residuals; and D) optimizing the warp and link parameters to minimize said objective, thereby producing a calibrated distortion model. In embodiments, the warp comprises bivariate polynomials of total degree three or higher. In embodiments, the link functions comprise bivariate polynomials of total degree three or higher. In embodiments, the node correspondences include gap centers and/or line intersections obtained from a calibration target. In embodiments, D) enforces equality constraints requiring the link functions to interpolate node values. In embodiments, D) comprises: D1) affine seeding from nodes; D2) linear least-squares solving of link functions under node equality constraints; D3) nonlinear warp recovery with links fixed; and D4) joint nonlinear refinement. In embodiments, line-scan residuals are weighted with weights in proportion to quadrature and/or Voronoi area and/or an inverse-variance factor. In embodiments, the method, further comprises: E) applying the calibrated warp (or its inverse) to undistort subsequently captured images. In embodiments, the basis for the warp and link functions comprises any of Legendre, Chebyshev, monomial, radial, or spline polynomials, or a mixture thereof. In embodiments, the imaging system is selected from any of an X-ray detector, visible-light camera, infrared camera, or ultrasound imaging system. In embodiments, three or more horizontal lines and three or more vertical lines are used to provide dense line-scan constraints with limited occlusion. In embodiments, robust loss functions are applied to at least one residual family to attenuate outliers or partial occlusions. In embodiments, scans lines and/or the gaps in the markers are used to fit an un-distortion model.

According to another aspect of the disclosure, a system for calibrating geometric distortion in an imaging system comprises: one or more processors, operatively coupled to the imaging system; a memory, operatively coupled to the one or more processors, configured to store computer executable instructions that, when executed by the one or more processors, cause perform a method comprising: A) receiving calibration data comprising (i) a set of node correspondences between known reference coordinates and measured image coordinates, and (ii) line scan samples acquired along images of scene lines of known offset and orientation; B) selecting a parametric two dimensional warp that maps reference coordinates to image coordinates and an auxiliary link function that relates v to (u,y) and u to (x,v); C) forming an objective comprising node fit residuals, warp link coupling residuals, and link vs scan residuals; and D) optimizing the warp and link parameters to minimize the objective, thereby producing a calibrated distortion model.

According to another aspect of the disclosure, a computer program product comprising a non-transitory computer-readable storage medium containing computer executable instructions that, when executed by one or more processors, cause a machine to perform a method comprising: A) receiving calibration data comprising (i) a set of node correspondences between known reference coordinates and measured image coordinates, and (ii) line scan samples acquired along images of scene lines of known offset and orientation; B) selecting a parametric two dimensional warp that maps reference coordinates to image coordinates and an auxiliary link function that relates v to (u,y) and u to (x,v); C) forming an objective comprising node fit residuals, warp link coupling residuals, and link vs scan residuals; and D) optimizing the warp and link parameters to minimize the objective, thereby producing a calibrated distortion model.

BRIEF DESCRIPTION OF THE DRAWINGS

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. Furthermore, elements may not be drawn to scale.

DETAILED DESCRIPTION OF THE DISCLOSURE

As used herein the term “radiographic” or “radiography” or variations thereof are intended to include both traditional X-ray technology and images and as well as fluoroscopy or fluoroscopic technology and images.

The disclosed calibration target is used in systems and methods for combining optical and radiographic data to enhance imaging capabilities. Such systems and methods combine both visually obtained patient pose position information and radiographic image information to facilitate calibrated surgical navigation. Such process involves a data acquisition phase, a system calibration phase, a volume reconstruction phase, and a surgical navigation phase, all resulting in the alignment of instrument coordinates with the patient and reconstructed volume coordinates enabling tracking and navigation of surgical instruments within a reconstructed 3D volume of a patient anatomy, even if the such anatomy is not exposed during a procedure. The data acquisition phase, volume reconstruction phase, and surgical navigation phase are described in detail in U.S. Pat. Nos. 12,361,631, 12,444,127, 12,462,469, and US Patent Application Publication US20250186163-A1, the subject matters of which are incorporated herein by this reference for all purposes.

Figure 1:
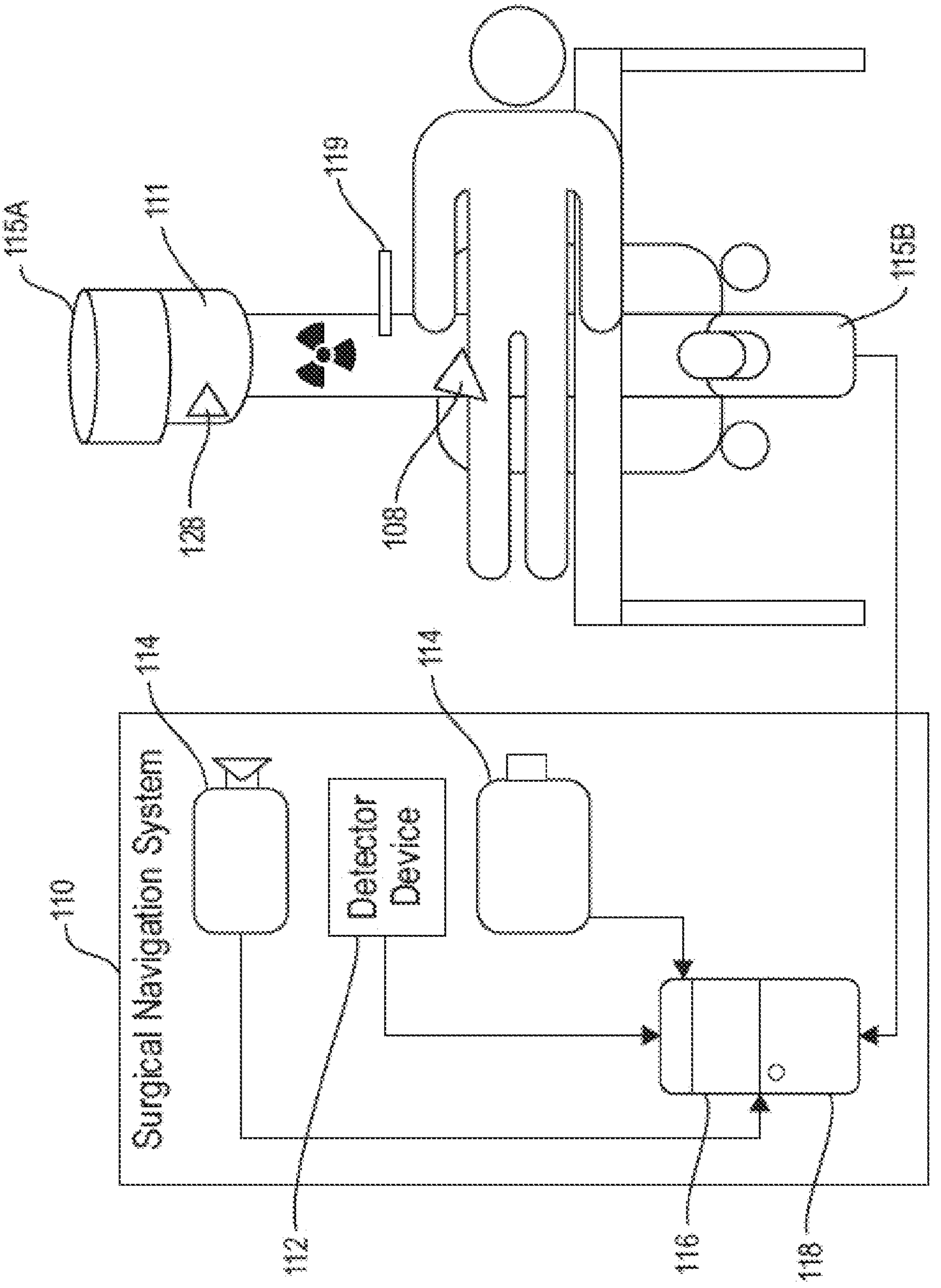
FIG. 1 is a conceptual illustration of a surgical navigation system in accordance with the disclosure.

FIG. 1 illustrates conceptually a surgical navigation system 110 suitable for use with the disclosed calibration target device. The surgical navigation system 110 may be used with a traditional fluoroscopy machine, e.g. a C-arm, having a source of radiation 115B disposed beneath the patient and a radiographic image detector 115A disposed on the opposite side of the patient.

In embodiments, surgical navigation system 110 comprises reference markers 108 or 128, a radiation detector 112, a calibration target 111, cameras 114, computer 118, and a display interface 116 used with a radiation source 115B and radiographic image detector 115A, device 115A. In embodiments, the components of surgical navigation system 110 may be contained within a single housing which is easily positionable along three axes within the surgical procedure space. Alternatively, one or more the components of surgical navigation system 110 may be located remotely from other components but interoperable therewith through suitable network infrastructure. The surgical system 110, and particularly cameras 114, track the reference marker 108 or 128 within the camera coordinate system, e.g. the patient coordinate system, and forward the positional information of the reference markers onto computer 118 for further processing.

One or more external optical camera 114 may be positioned to capture the operating area, as illustrated, and detect optical reference marker 108 attached to the patient and the reference marker 128 attached to the calibration target 111. External optical camera 14 provides real-time tracking of the 6-DoF poses (rotation and translation) of the markers 108 and 128. In embodiments, camera 114 may be implemented using one or more visible light cameras to capture real-time images of the surgical field including the patient and X-ray imaging system, e.g. a fluoroscope. A camera suitable for use as camera 114 is the Polaris product line of optical navigation products, commercially available from Northern Digital, Waterloo, Ontario, Canada. Visible light cameras or infrared cameras may be used as camera 114. External camera 114 may be in communication with one or both of synchronizing device 112 and a processing unit 118. When the imaging systems X-ray is triggered, synchronizing device 112 identifies X-ray emissions relative to a predefined threshold level and signals computer 118 and/or external camera 114 and to capture pose information of the patient and imaging system itself via reference markers 108 and 128, respectively. In embodiments, a custom designed optical camera operating in the visible light spectrum, may be utilized as camera 114. In embodiments, such custom designed optical camera may be operably coupled with other elements in system 110, including an embedded AI compute module, a 4k monitoring camera, a medical-grade Wi-Fi chip for high-bandwidth communication, audio, a gyroscope, and security controls to address HIPAA.

Reference markers 108 and 128 are fiducial markers that are easily detectable by the optical camera 114 and are attached to the patient and the calibration target 111, respectively, and serve as points of reference for coordinate transformations. The implementation of reference markers 108 and 128 is set forth in greater detail in US Patent Application Publication US20250186163-A1, and co-pending U.S. patent application Ser. No. 19/204,187, entitled "Omni-View Unique Tracking Marker", the subject matters of which are incorporated herein by this reference for all purposes.

Figure 2:
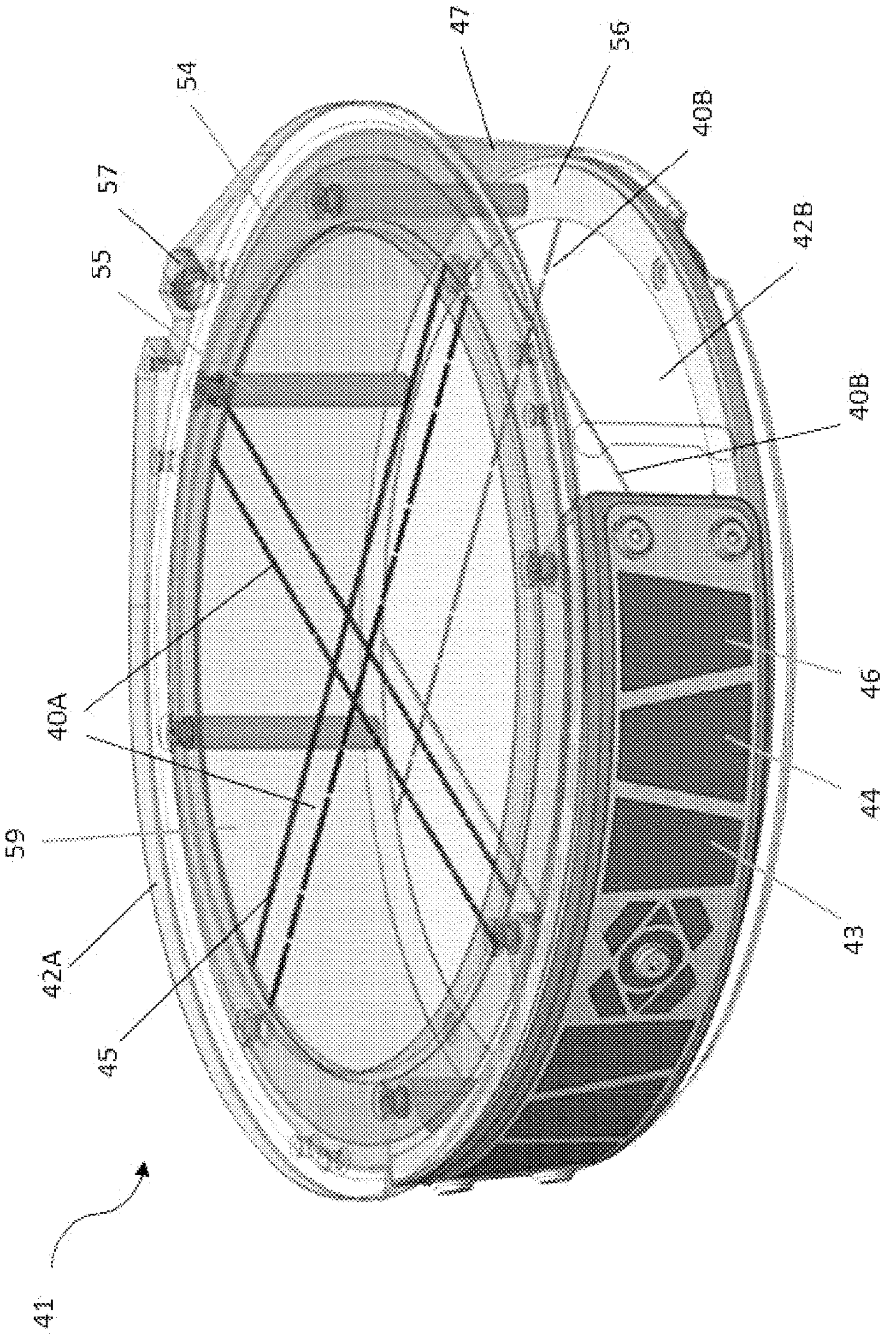
FIG. 2 is a perspective view of a calibration target apparatus in accordance with an illustrative embodiment.
Figure 3:
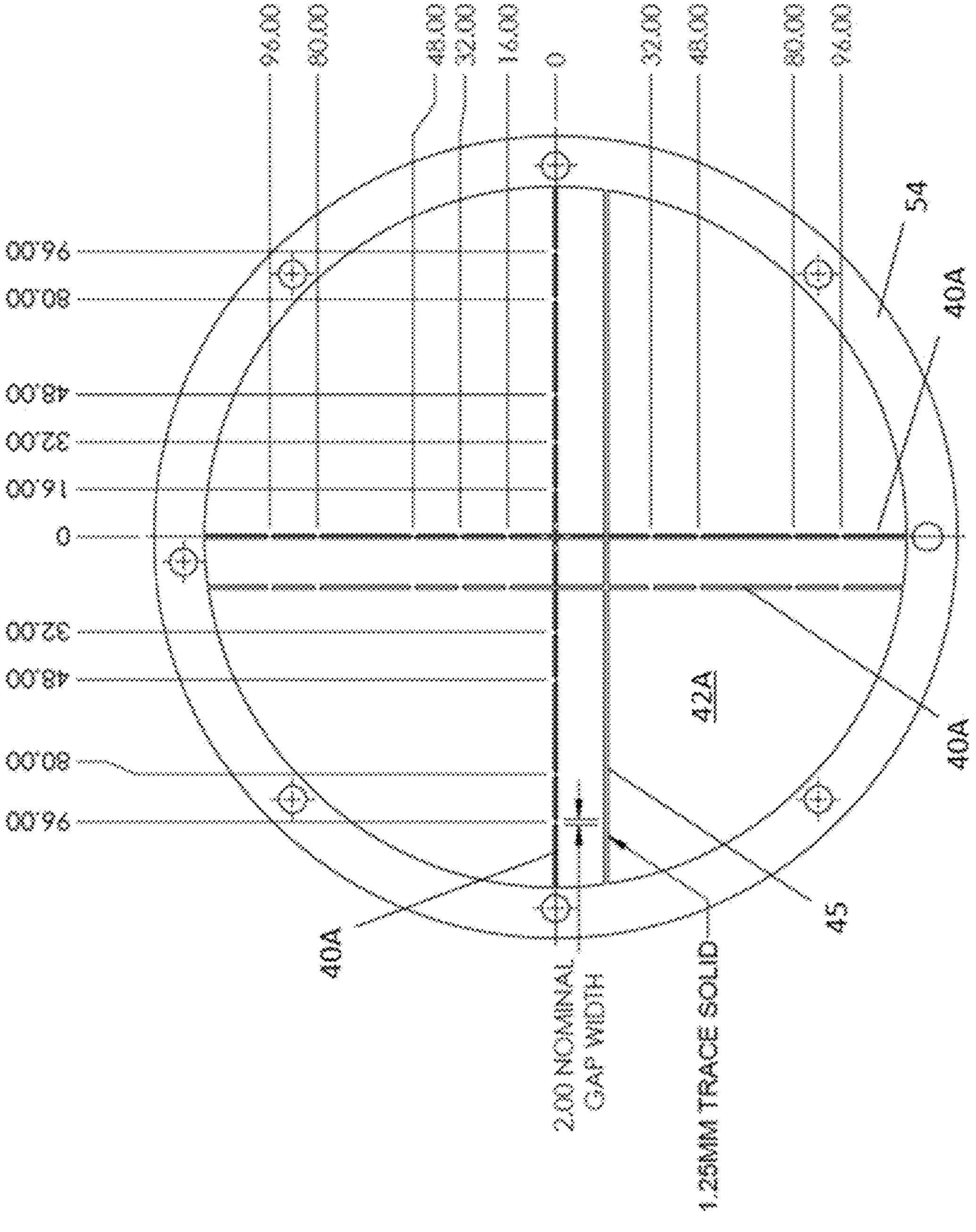
FIG. 3 is a top view illustration of the calibration target apparatus of FIG. 2 in accordance with an illustrative embodiment.
Figure 4:
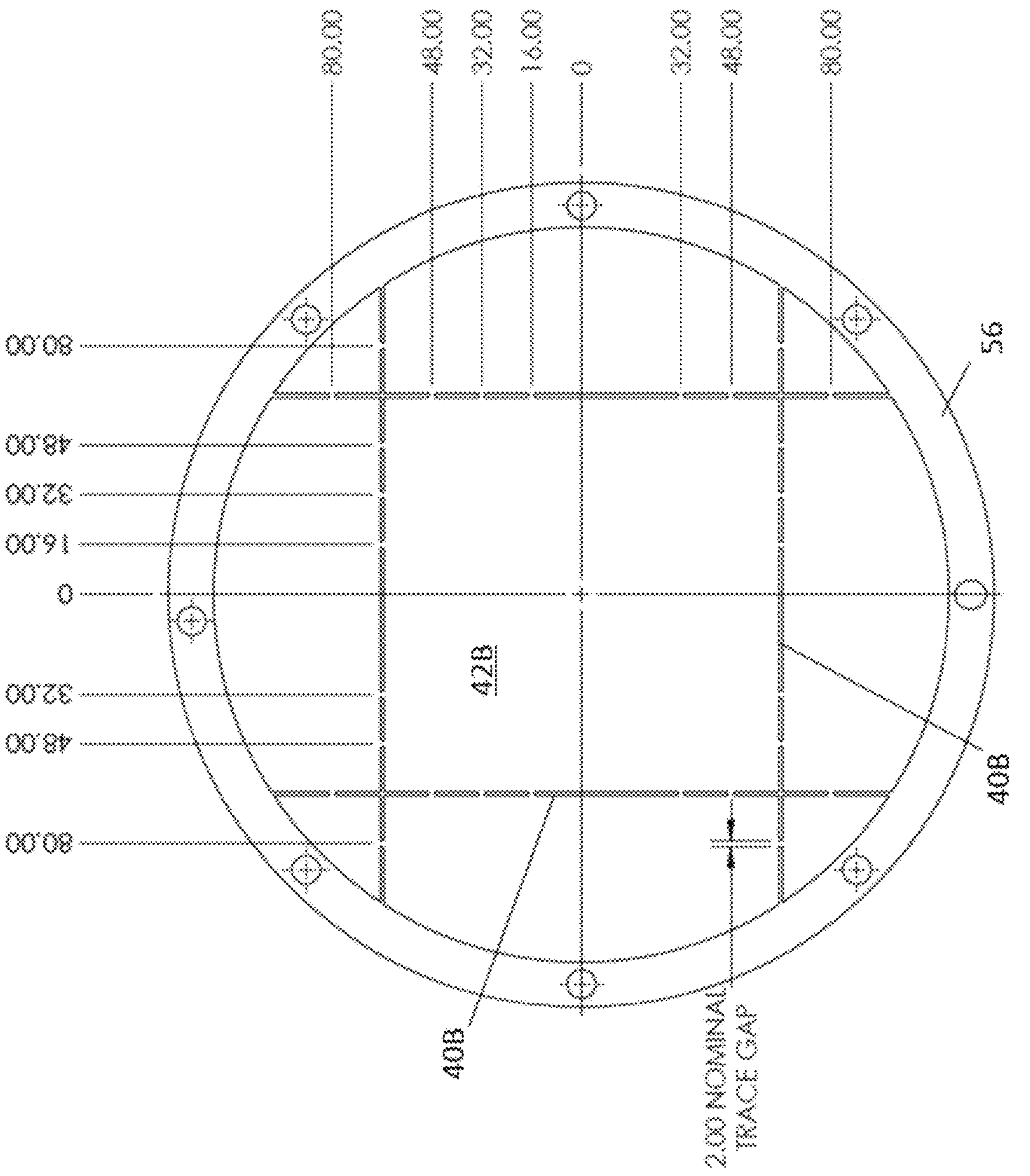
FIG. 4 is a bottom view illustration of the calibration target apparatus of FIG. 2 in accordance with an illustrative embodiment.

In embodiments, a calibration target 111, attachable to the radiographic image detector 115A, may be implemented with radiopaque markers embedded within the calibration target, as further described herein. The markers 40, as illustrated in FIG. 2-4 have known 3D spatial coordinates relative to reference marker 128 attached to the calibration target 111. Such markers are visible in the captured radiographic images and can be used for calibrating the radiographic imaging system, as explained herein.

Surgical Instrument(s) 119 may be equipped with Infrared markers or tracked using object recognition and 3D localization algorithms, as described further herein, and allow for real-time tracking and alignment within a 3D volume of CT quality images reconstructed from two radiographic image, e.g. X-rays.

Display interface 116 is operably coupled to computer 118 and provides real-time visual feedback to the surgical team, showing the precise positioning and movement of the patient, imaging system itself, and any instruments. A display interface 116 suitable for use is the 13" iPad Air, commercially available from Apple Computer, Inc. Cupertino, CA, USA, however, other commercially available surgical monitor may be used. As noted previously, the display interface may be located remotely from the computer 118 to facilitate more convenient positioning of the display interface 116 for the surgeon during the procedure.

A radiographic image detector 115A, such as a CT scanner, C-arm CT scanner, or X-ray scanner, or other radiographic image detector, can be connected to the computer 118 via network interface 225 to input image data to the computer 118. It is possible to implement the radiographic image detector 115A and the computer 118 as one device. It is also possible that radiographic image detector 115A and the computer 118 communicate wirelessly through a network infrastructure. In embodiments, the computer 118 can be located remotely with respect to the radiographic image detector 115A and the process described herein can be performed as part of a server or cloud based service. In this case, the process may be performed on a single computer or distributed between multiple networked computers. The computer 118 also includes one or more network interfaces 125 for communicating with other devices via a network. The computer 118 also includes other input/output devices 222 that enable user interaction with the computer 118 (e.g., display, keyboard, mouse, speakers, joystick controllers, etc.). One skilled in the art will recognize that an implementation of an actual computer could contain other components as well, and that FIG. 1 is a high level representation of such a computer for illustrative purposes.

The proposed system 110 revolutionizes the reconstruction of 3D volumes from X-ray images by integrating machine learning or deep learning techniques. System 110 is specifically designed to effectively reconstruct complete and accurate 3D volumes using a limited number of X-ray images, even when these images are obtained from a restricted angular range.

U.S. Pat. No. 12,462,469 discloses a prior calibration target device for use with a radiographic image detector includes a target body securable to the image detector and a plurality of radiopaque markers, e.g. solid wires, fixed to the target body, wherein access to the image detector by incident radiation is at least partially blocked by the plurality of linear markers. By using the geometric properties of wires and advanced detection techniques, a precise calibration suitable for high-quality, volumetric three-dimensional CT reconstruction from bisupport X-ray images is achieved.

Calibration Target

The calibration target device disclosed herein utilizes different geometric constraints for imaging distortion correction by using linear markers with patterns having intentional gaps that yield discrete node features while minimizing scene occlusion. A support body carries multiple substantially straight elongated markers arranged, e.g., orthogonal sets, across a field. Gaps at predetermined positions, together with line intersections, define a dense set of fiducial node locations known in the calibration target's reference frame. At least one orientation-reference, a "reference" marker, physically differs from the other markers, e.g., no gaps, unique gap code, or greater thickness marker, to disambiguate rotation and mirror flips in a captured image. In embodiments, the markers may be partially of completely radiopaque implementations, e.g., copper traces on printed circuit board, for X-ray systems, mounting features for C-arm detectors, and visual implementations for optical cameras.

In embodiments, the disclosed calibration target 111 may comprises a target body 41 capped at one end or oppose ends by support surfaces 42A and 42B, one or both of which have markers 40 former therein, as illustrated by the configuration of FIG. 2. In embodiments, both support surfaces 42A and 42B are implemented with separate planar surfaces, both disposed proximate one end of target body 41 but separated from each other by an air gap, each of support surfaces 42A and 42B carrying markers 40, as further described herein.

In embodiments, target body 41 comprises a pair of concentric ring-shaped frames 54 and 56 coupled together, but spaced apart, by posts 55, which collectively form the target frame defining an interior passage 59 along an axis extending through their respective centers. In embodiments, the target body 41 may be made from a substantially rigid or semirigid material such as metals, plastics, vinyl or any synthetic polymers. In embodiment, the support surfaces 42A and 42B may be implemented with any of a rigid printed circuit board, glass, acrylic, FR 4 substrate, Liquid Crystal Polymer, polyimide, metal plate, or transparent substrate for visual modalities In embodiments, target body 41 has a substantially circular shape which is attachable directly to the radiation detector housing of an imaging system, e.g. a C-arm X-ray machine, or, may have other shapes adapted to be secured within the path of radiation incident on the radiation detector of an imaging system, e.g. target body 41 may have a substantially rectangular shape attachable directly to an imaging system having a rectangular radiation detector housing. Attachment may occur through frictional engagement of other means for temporarily securing the calibration target 111 to the radiation detector housing of an imaging system. In embodiment, the one or more attachment devices such as holes, posts, clips, or bracketry are located on the target body 41 to removably position the calibration target 111 against the radiation detector, e.g., C arm image intensifier face. As shown in FIG. 2, a screw hole 57 in one of support surface 42A and 42B facilitates removably securing calibration target 111 to the radiation detector of an imaging system. A sidewall 47 encloses the exterior of target body 41, as illustrated. One of surface 42A and 42B support are attached at each end to target body 41. In embodiments, 42A and 42B are made of a material that is essentially transparent to radiation incident thereon so as not to block such radiation passing through interior passage 59 from reaching the radiation detector.

In embodiments, multiple reference elements 43, 44 and 46 are attached to or embedded into a sidewall 47 or other surface of target body 41. Each of elements 43, 44 and 46 may have a similar or different shape relative to the other of the elements, but each element 43, 44 and 46 has a unique position relative to the target body 41. In this manner, when viewed by a color or visible light camera, the unique geometry and surface texture of elements 43, 44, and 46 enables the calibration target 111 to be easily distinguished from its surroundings, regardless of a camera angle(s), to enable precise tracking of the position and orientation of target 111 and radiation detector 115A in a three-dimensional space. With calibration target 111, illustrated herein, there is no need for additional reference markers to determine the position of the imaging system to which the calibration target 111 is attached since the reference elements 43, 44 and 46 collectively are detectable from the exterior of calibration target 111.

Markers

The disclosed calibration target 111, further comprises a plurality of at least partially radiopaque linear markers 40 arranged in specific geometries and at different depths within the target body 41 of the calibration target itself. Such configuration enables deep learning models detect the markers in the 2D X-ray images. The markers 40, as illustrated in FIGS. 2-5 have known 3D spatial coordinates relative to reference elements 43, 44, and 46 attached to the calibration target 111 which is, in turn, is securable to radiation detector 115A. Such markers are visible in the radiographic images captured by radiation detector 115A and may be used for calibrating the radiographic imaging system. In embodiment, the markers 40 may be implemented in substantially straight line patterns arranged as at least two non-collinear sets, e.g., horizontal and vertical.

In embodiments, calibration markers 40 may be implemented as traces or paths on a printed circuit board and made of all or partially radiopaque material, e.g., copper, tungsten or steel, to ensure visibility in X-ray images. In embodiments, supports 42A and 42B, and therefore the markers 40 carried thereby, may be arranged at different known depths with interior passage 59 relative to the plane or face of the radiation detector to provide known 3D spatial information. In embodiments, surface 42A and 42B, and therefore the markers 40 may be positioned such that they are generally parallel to the face of the radiation detector, simplifying the projection geometry. In embodiments, the diameter of the markers is optimized to be large enough to be visible in the detected radiation images but small enough to occupy minimal pixel area to facilitate digital subtraction.

In embodiment, the markers 40 may be implemented with a plurality of substantially linear paths arranged in a known geometric pattern. In embodiments, one or more of markers 40 have intentionally absent segments or gaps at predetermined positions. In embodiment, the first set of markers 40A may be disposed on support surface 42 while the second set of 40B may be disposed on support surface 52, causing the markers to appear to intersect with one another when overlayed or superimposed upon one another due to their different height positions. Such intersections serve as nodes along with gap-derived features, e.g., gap centers or endpoints referenced to a crossing. In embodiment, at least one marker 45 is distinguished from other of markers 40, by either the absence of gaps, a unique gap pattern of code, and/or a greater thickness dimension than other of the markers 40 when viewed to facilitate disambiguation in a captured image.

In embodiments, calibration target 111 comprises a target body 41 including a support surface 42 providing a surface for a plurality of elongated markers 40 as substantially straight lines, each elongated marker including a plurality of intentionally absent segments, e.g. gaps, at predetermined positions. The set of intersections between markers 40 and locations of the gaps jointly define a plurality of fiducial node positions predetermined in a reference coordinate frame of the calibration target and detectable in a captured image. In embodiments, the gaps are placed with approximately uniform spacing while excluding the proximate areas of marker intersections. In embodiments, at least a portion of the gaps are placed according to a randomized or basis-optimized pattern to reduce degeneracy.

In embodiments, markers 40 may comprise a first set of elongate substantially parallel markers 40A and a second set of elongate substantially parallel markers 40B oriented transversely to the first set to form a sparse grid 49 across support surface 42.

In embodiments, the orientation-reference marker 45 is distinguished from other elongated markers by at least one of: a) absence of gaps; (b) a gap-spacing pattern unique relative to other elongated markers; or (c) a different line thickness, thereby enabling disambiguation of a rotational and/or mirror orientation of the target in the captured image.

In embodiments, at least one set of elongated markers 40A or 40B is formed on a first surface of support surface 42 and a transverse set of elongated markers is formed on a second surface of the support surface 42, enabling crossings without electrical contact. In embodiments, the support surface 42 is transparent and the markers 40 appear as visible-contrast lines for optical imaging systems. The use of two separate support surfaces at different “heights” within interior passage 59, e.g. different distances from the image detector, facilitates estimation of the focal length of the X-ray machine.

In embodiments, the elongated markers 40 may be fabricated from any of metal foil, printed ink, vapor-deposited metal, or laser-ablated coatings. In embodiments, at least one pair of markers 40 is arranged at non-orthogonal angles to increase spatial diversity of node locations. In embodiments, the support surface 42 and markers 40 are sterilizable for use in operating-room environments.

In embodiment, markers 40 may be implemented as metallic traces, e.g., copper or copper-nickel, formed on a printed circuit board using any of lithography/etching, optional plating or solder mask clearance processes to tune attenuation. First and second sets of markers 40, markers 40A and markers 40B, respectively, can be disposed on different surfaces of a single support substrate or on surface of different supports, as illustrated in FIG. 2, creating the appearance of intersecting, without actual physical or electrical contact. FIG. 3 is an illustration of support surface 42 showing the patterns of markers 40A carried thereby including gaps, intersections, and a reference marker 45. FIG. 4 is an illustration of support surface 52 showing the patterns of markers 40B carried thereby including gaps, and intersections. In FIGS. 3 and 4, the gaps in each marker pattern are labeled with a position the X-axis or Y-axis, as applicable.

Such gap placement data facilitate downstream processing of the captured radiographic images, as explained elsewhere herein.

Figure 5:
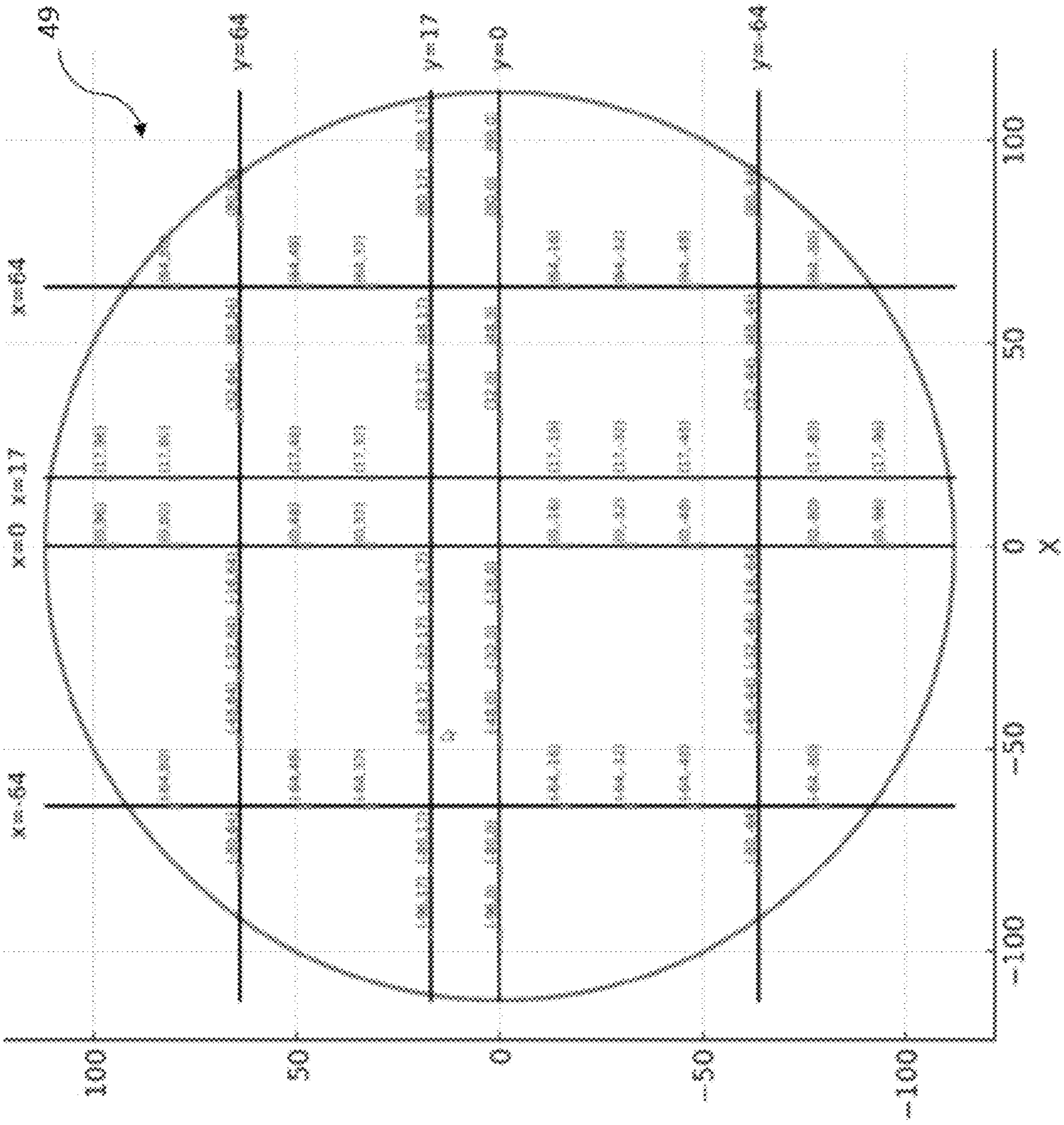
FIG. 5 illustrates conceptually the grid appearance created by the superimposed positions of the marker sets in accordance with an illustrative embodiment.

FIG. 5 is an X-Y coordinate graph of the superimposed co-ordinate positions of marker sets 40A and 40B of FIGS. 3 and 4, respectively, as reflected through a diagonal axis, including gap placement strategies. In embodiments, such gap placement strategies within the marker patterns may include any of uniform gaps at intersections, gap randomization, and gap placement for optimized reference. In embodiments, the thickness of the lines and size of the gaps in the patterns of markers 40 may be uniform, except for reference marker 45. In embodiments, in FIG. 5, the marker pattern at X=0 may also be a solid line without gaps.

In embodiments, gap placement within the marker lines is used to facilitate downstream processing of the captured images, including the location detection and distortion correction of markers 40 within the captured images, as explained in greater detail. Specifically, in embodiment, the gaps within markers 40 have uniform sampling with intersection exclusion, e.g. approximately even spacing, skipping locations of marker crossings.

Using the markers described herein, randomized or aperture-coded sampling may be utilized to avoid degeneracy in the marker patterns. Further, basis-optimized placement of nodes relative to expected distortion bases within the image detector may be utilized to further minimize distortion.

In embodiments, the first set of markers 40A and the second set of markers 40B may be implemented on one of support surface 42 or 52. In such configuration, markers 40A and 40B may be formed on opposing sides of a printed circuit board or substrate, or within different layers of a multilayer printed circuit board or substrate, without the markers actually physically or electrically intersecting.

In embodiments, the first set of markers 40A and the second set of markers 40B may be implemented on only one of support surfaces 42 or 52. In such configuration, markers 40A and 40B may be formed on opposing sides of a printed circuit board or substrate, or within different layers of a multilayer printed circuit board or substrate, without the markers actually physically or electrically intersecting.

An additional advantage of the disclosed apparatus and method includes manufacturing efficiency and robustness. High manufacturing repeatability eliminates the need for individual calibration of each target. The disclosed target calibration device is lightweight and durable, facilitating easy attachment to the C-arm detector and handling in clinical environments.

In use, the disclosed calibration target 111 is affixed to an existing imaging system, e.g. a C-arm fluoroscopy machine, with a know position, allowing for the position of the calibration target and its markers to also be computed. Next, target is first positioned in the field of view of the imaging system. Next, a plurality of images, e.g., X-rays of the target are captured using the imaging system. The elongated markers, gaps, intersections, and the reference marker as described herein are detectable in one or more of the captured images. The feature locations and orientation are output as calibration data for further processing.

A method of obtaining calibration data for distortion correction of an imaging system, using the calibration target describer herein comprises: positioning the calibration target of within a field of view of an imaging detector; capturing image data of the calibration target, the image depicting the elongated markers, the gaps, and the fiducial node positions; and detecting, in the captured image data, the positions of the fiducial node positions and, when present, the orientation-reference marker, thereby producing calibration data for downstream processing. In embodiments, the imaging system is a C-arm fluoroscopic X-ray system and capturing comprises acquiring at least one X-ray projection. In embodiments, the positioning comprises mounting the target directly on, or immediately in front of, the imaging detector using the mounting features. In embodiments, detecting the orientation-reference marker comprises identifying a marker lacking gaps along substantially its entire length, or with a unique gap code, or with greater line thickness.

Distortion Calibration Using Polynomial Warp and Link-Function Constraints

According to another aspect of the disclosure, using a calibration target similar to those described herein, disclosed is a method to calibrate geometric distortion in imaging systems by jointly fitting a smooth two-dimensional warp and auxiliary link functions using both sparse node correspondences (e.g., gap centers and/or intersections from a target) and dense line-scan samples (e.g., pixel traces of known horizontal/vertical lines).

As used herein the term "Node" refers to a discreet target feature, e.g., gap center, gap endpoints averaged, or grid intersection, with known reference coordinates ($x_k$, $y_k$) and measured image coordinates ($u_k$, $v_k$).

As used herein the term "Line scan(s)" refers to acquired sets $\{(u_{ij}, v_{ij})\}$ sampled along the distorted image of known lines $y=y_i$ (horizontal) and $x=x_j$ (vertical). In embodiments, preferred use, three horizontal and three vertical lines provide rich constraints with limited occlusion; other counts are possible.

As used herein the term "Basis" refers to a set of vectors that is both linearly independent and spans a vector space. This means that any vector in the space can be expressed as a unique linear combination of the basis vectors. Essentially, a basis provides a coordinate system for the vector space, allowing for the representation of all vectors within that space.

The disclosed method for calibrating geometric distortion in an imaging system, comprises: A) receiving calibration data comprising (i) a set of node correspondences between known reference coordinates and measured image coordinates, and (ii) line scan samples acquired along images of scene lines of known offset and orientation; B) selecting a parametric two dimensional warp that maps reference coordinates to image coordinates and an auxiliary link function that relates v to (u,y) and u to (x,v); C) forming an objective comprising node fit residuals, warp link coupling residuals, and link vs scan residuals; and D) optimizing the warp and link parameters to minimize the objective, thereby producing a calibrated distortion model.

Figure 6:
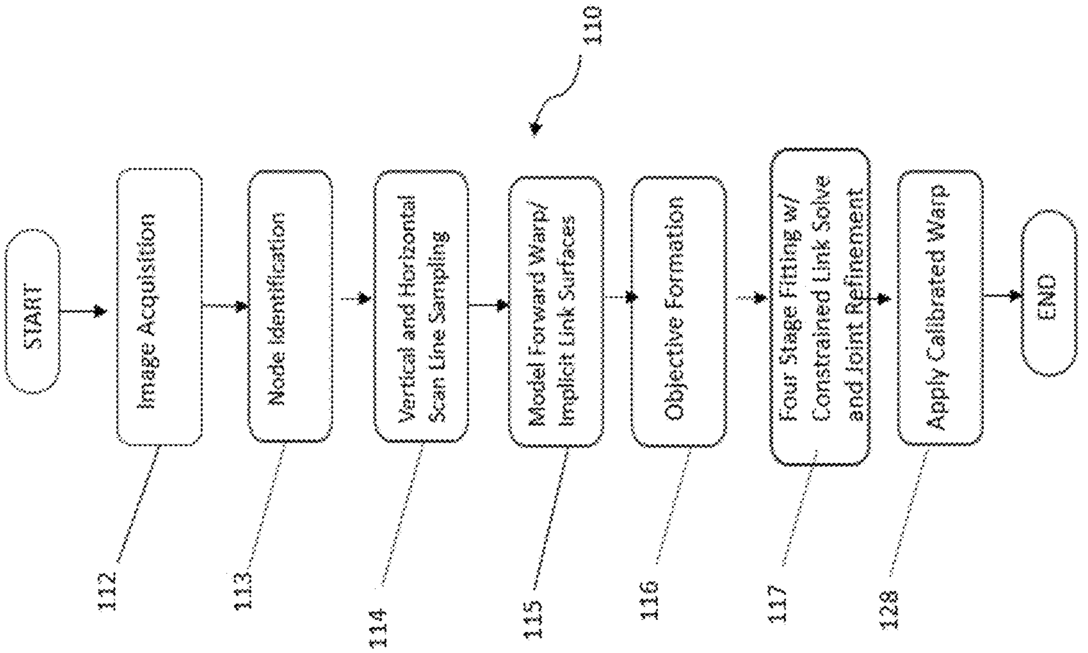
FIG. 6 is a high level process flow of the process to calibrate geometric distortion in imaging systems in accordance with the disclosure.

FIG. 6 illustrates conceptually the method process flow 110 for a joint warp plus link calibration framework that can be used to reduce distortion in images captured by an imaging system using a calibration target illustrated in FIGS. 2-5 similar. First, one or more images are captured, e.g. X-rays, as illustrated by the Input Acquisition process block 112, with the resulting image including a grid pattern 49, similar to that illustrated in FIG. 5. In embodiments, the node correspondences include gap centers and/or line intersections obtained from a calibration target. Next, given know co-ordinates of the nodes, positional data is collected, as illustrated by the Node Identification process block 113. In embodiments, K high accuracy nodes having the form of {(x_k,y_k)→(u_k,v_k)} are collected.

Next, dense samples along the small number of known y=y_i (horizontal) and x=x_j (vertical) lines 40*a* and 40B, are performed, as illustrated by Vertical and Horizontal Scan Line Sampling process block 114. In embodiments, three or more horizontal lines and three or more vertical lines are used to provide dense line-scan constraints with limited occlusion. Following node identification and line sampling, the node coordinates in grid 49 are determined, as shown in the exemplary grid of FIG. 5.

Next, Forward Warp and Implicit Link Surfaces are modelled, as illustrated by the process block 115. In embodiments, such modelling uses the Ansatz method to find an image-agnostic basis for the forward warp and link computations. The Ansatz method can significantly simplify complex differential equations, making them more tractable and is a valuable tool for solving differential equations, providing a structured approach to finding solutions through educated assumptions and systematic verification. A description of a Forward Warp model suitable for use with the disclosed method is set forth below.

Forward warp (degree-3 exemplar with orthogonal basis $P_n$ on [−1,1]):

$$u(x, y) = \sum_{p+q\le 3} c_{pq} P_p(x) P_q(y)$$

$$v(x, y) = \sum_{p+q\le 3} d_{pq} P_p(x) P_q(y)$$

In embodiments, the warp comprises bivariate polynomials of total degree three or higher. Other bases (Chebyshev, monomials, radial/spline, mixed) may be used.

A description of an Orientation-Aware Link Model suitable for use with the disclosed method is set forth below.

Orientation-Aware Link Model:

Projected coordinates for any line m:

$$\tilde{u} = [n_y \; -n_x]\begin{bmatrix} u \\ v \end{bmatrix}$$

$$\tilde{v} = [n_x n_y]\begin{bmatrix} u \\ v \end{bmatrix}$$

Where offset $c=c_m$ and normal $(n_x, n_y)=(n_{x,m}, n_{y,m})$ are known per line m.

Steerable implicit link (single global parameter set):

$$\Phi(\tilde{u}, \tilde{v}; c, n_x, n_y) = \sum_{i+j+k\le D_\Phi} \sum_{l=1 \ldots L_\Phi} a_{ijkl} P_i(\tilde{u}) P_j(\tilde{v}) P_k(c) B_l(n_x, n_y) = 0$$

$P_{i,j,k}$ are 1D orthogonal polynomials/basis functions; $B_l$ is an orientation basis (e.g. polynomial in $(n_x, n_y)$ or Fourier in θ). Coefficients $\alpha_{ijkl}$ are shared across all lines and orientations.

Axis-aligned link model (for axis-aligned line samples):

$$u = G(x, v) = \sum_{i+j\le 3} \gamma_{ij} P_i(x) P_j(v)$$

$$u = H(u, y) = \sum_{i+j\le 3} \delta_{ij} P_i(u) P_j(y)$$

In embodiments, the link functions comprise bivariate polynomials of total degree three or higher.

Note, other bases, e.g. Chebyshev, monomial, radial, splines, may be used without parting from the spirit of the disclosure.

Next, an objective is formed comprising node fit residuals, warp link coupling residuals, and link vs scan residuals, as illustrated by process block 128.

A description of Residuals and Objective and suitable for use with the disclosed method is set forth below.

Nodes (warp vs. data):

$$r_k^u = u(x_k, y_k) - u_k$$

$$r_k^v = v(x_k, y_k) - v_k$$

Coupling (warp vs. links):

$$s_k^H = v(x_k, y_k) - H(u(x_k, y_k), y_k)$$

$$s_k^G = u(x_k, y_k) - G(x_k, v(x_k, y_k))$$

Line-fit (links vs. scans):

$$\text{Genral line scans}: t_{m,j} = \Phi(\tilde{u}_{m,j}, \tilde{v}_{m,j}; c_m, n_{x,m}, n_{y,m})$$

For axis-aligned line scans: Horizontal line samples:

$$t_{ij}^H = H(u_{ij}, y_i) - v_{ij};$$

Vertical line samples:

$$t_{ij}^G = G(x_j, v_{ij}) - u_{ij}.$$

In embodiments, the objective function may be a weighted sum of squares, or other robust objective function form, e.g. Huber, etc. Optional weights may reflect quadrature area (e.g., Voronoi) and/or inverse noise variance and/or optimal basis-specific estimator, with optional regularization, e.g. mild ridge on degree-3 blocks of c, d, γ, δ. The sum of all objective function terms is minimized.

Next, the warp and link parameters are optimized to minimize the objective, thereby producing a calibrated distortion model, as illustrated by process block 117. In embodiments, such optimization enforces equality constraints requiring the link functions to interpolate node values. In embodiments, such optimization may comprise: i) affine seeding from nodes; ii) linear least squares solving of link functions under node equality constraints; iii) nonlinear warp recovery with links fixed; and iv) joint nonlinear refinement. More specifically, such optimization may comprise i) affine seeding from nodes; ii) linear least squares solving of link functions under node equality constraints; iii) nonlinear warp recovery with links fixed; and iv) joint nonlinear refinement. This process may be implemented with an optional four-stage fitting pipeline comprising the acts of: 1) Affine seed on nodes; linear degree-1 links matching nodes; 2) Cubic link solve: hold affine warp; fit γ, δ by equality-constrained LS so nodes are exact; use KKT or null-space; 3) Warp recovery: hold links; solve nonlinear LS for all warp coefficients using node and coupling equations (over-determined); and 4) Joint refinement: optimize c, d, γ, δ with LM; block-eliminate link parameters; retain area/noise weights and mild ridge.

Next, the calibrated warp (or its inverse) is applied to undistort subsequently captured images, as illustrated by process block 128.

In embodiments of the above described method, the basis for the warp and link functions comprises any of Legendre, Chebyshev, monomial, radial, or spline polynomials, or a mixture thereof. In embodiments, robust loss functions are applied to at least one residual family to attenuate outliers or partial occlusions.

The disclose method may be implemented with a number of variations including Basis choice, number of degree, e.g. ≥3, multi-view fusion, occlusion handling by masking, and robustness loss on outlier values. The disclose method is image modality agnostic and can be used with different imaging technologies, including X-ray, optical, infrared, thermal, and ultrasound B-mode (when line/point features are available) imaging technologies.

Advantages of the disclosed method include: dense shape capture with few lines; exact node anchoring; principled weighting; global polynomial mitigates gauge ambiguity; robustness to partial occlusions.

The pattern of the markers 40, transversing or extending across at least part of the image, enables the fitted polynomials to capture image distortions inherent in the imaging system. In image intensifier C-arm systems, distortions such as pincushion and S-curve distortions can significantly affect the accuracy of the projected marker positions. By fitting polynomials to the entire length of the lines or linear obstructions, caused by the markers 40 in the images, modelling these distortions accurately over different regions of the image is possible. This modeling provides valuable information about the distortion characteristics of the imaging system, allowing for correction during calibration. The fitted polynomials effectively serve as distortion maps, capturing both global and local distortion effects. Digital subtraction of markers from X-ray images is achieved through mask generation and inpainting processes. An inpainting algorithms is applied to fill in the regions corresponding to the markers 40 in the image.

Figure 7:
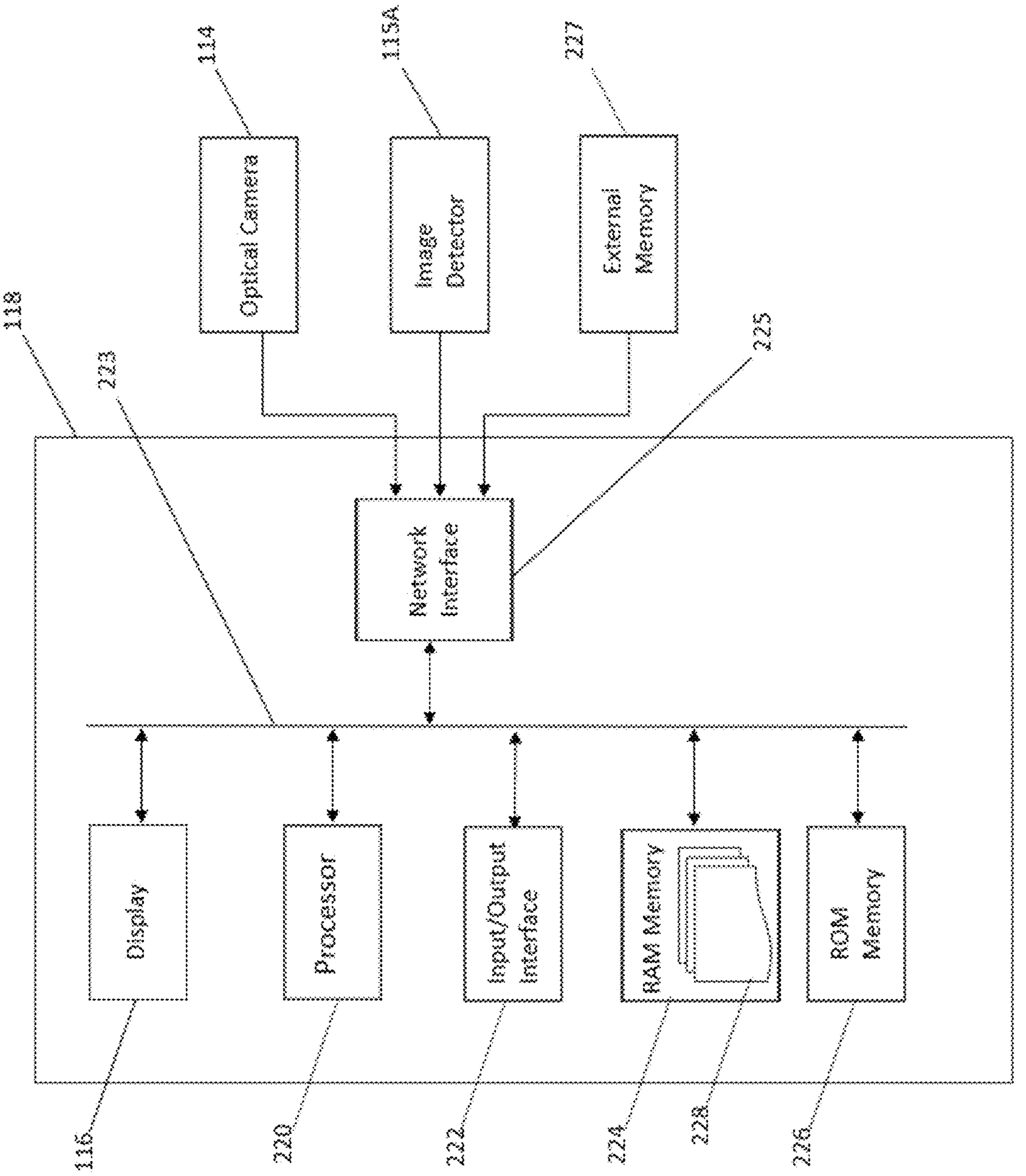
FIG. 7 is a conceptual illustration of a computer system suitable for use with the disclosed system and methods.

The methods described herein may be implemented on a computer 118 using well-known computer processors, memory units, storage devices, computer software, and other components. A high-level block diagram of such a computer is illustrated in FIG. 7. In embodiments, computer 118 comprises display 116, processor 220, I/O interface 222, memories 224 and 226, and network interface 225, all operatively interconnected by bus 223. Network interface 225 operatively connects cameras 114, radiographic image detector 115A, and external memory 227 to the other components of computer 118, as illustrated in FIG. 26. Processor 220 controls the overall operation of the computer 118 by executing software modules or applications comprising computer program instructions 288 which define such operation functionality. The computer program instructions 228 may be stored directly in memory 224 or in an external storage device 227 (e.g., magnetic disk) and loaded into memory 224 when execution of the computer program instructions is desired. Thus, the processes described herein may be defined by the computer program instructions stored in the memory 224 and/or storage 227 and controlled by the processor 220 executing the computer program instructions. ROM memory 226 typically contains computer program instructions comprising the operating system and basic input/output system firmware to provide runtime services for the operating and programs and to perform hardware initialization during power on startup processes.

A radiographic image detector 115A, such as a CT scanner, C-arm CT scanner, or X-ray scanner, or other radiographic image detector, can be connected to the computer 118 via network interface 225 to input image data to the computer 118. It is possible to implement the radiographic image detector 115A and the computer 118 as one device. It is also possible that radiographic image detector 115A and the computer 118 communicate wirelessly through a network infrastructure. In embodiments, the computer 118 can be located remotely with respect to the radiographic image detector 115A and the process described herein can be performed as part of a server or cloud based service. In this case, the process may be performed on a single computer or distributed between multiple networked computers. The computer 118 also includes one or more network interfaces 125 for communicating with other devices via a network. The computer 118 also includes other input/output devices 222 that enable user interaction with the computer 118 (e.g., display, keyboard, mouse, speakers, joystick controllers, etc.). One skilled in the art will recognize that an implementation of an actual computer could contain other components as well, and that FIG. 7 is a high level representation of some of the components of such a computer for illustrative purposes.

Although the systems and methods disclosed herein have been described with reference to patient anatomy and surgical navigation procedures, their applicability is not limited to the same. Any of the systems and methods disclosed herein may be utilized in other situations, including industrial control, package or baggage handling, or any other environments in which the near real-time position and tracking of objects within a volume is required.

References to "one embodiment", "an embodiment", "one example", and "an example" indicate that the embodiment (s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

At various places in the present specification, values are disclosed in groups or in ranges. It is specifically intended that the description includes each and every individual sub-combination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

For purposes of clarity and a concise description, features are described herein as part of the same or separate embodiments, however, it will be appreciated that scope of the concepts may include embodiments having combinations of all or some of the features described herein. Further, terms such as "first," "second," "top," "bottom," "front," "rear," "side," and other are used for reference purposes only and are not meany to be limiting.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to an example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first." "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A computer implemented method for calibrating geometric distortion in an imaging system, comprising:

A) receiving calibration data comprising (i) a set of node correspondences between known reference coordinates and measured image coordinates, and (ii) line scan samples acquired along images of scene lines of known offset and orientation;

B) selecting a parametric two dimensional warp that maps reference coordinates to image coordinates and an auxiliary link function that relates v to (u,y) and u to (x,v);

C) forming an objective comprising node fit residuals, warp link coupling residuals, and link vs scan residuals; and D) optimizing the warp and link parameters to minimize the objective, thereby producing a calibrated distortion model.

2. The method of claim 1, wherein the warp comprises bivariate polynomials of total degree three or higher.

3. The method of claim 1, wherein the link functions comprise bivariate polynomials of total degree three or higher.

4. The method of claim 1, wherein the node correspondences include gap centers and/or line intersections obtained from a calibration target.

5. The method of claim 1, wherein D) enforces equality constraints requiring the link functions to interpolate node values.

6. The method of claim 1, wherein D) comprises:

D1) affine seeding from nodes;

D2) linear least squares solving of link functions under node equality constraints;

D3) nonlinear warp recovery with links fixed; and

D4) joint nonlinear refinement.

7. The method of claim 1, wherein line scan residuals are weighted with weights in proportion to quadrature and/or Voronoi area and/or an inverse variance factor.

8. The method of claim 1, further comprising:

E) applying the calibrated warp or an inverse functional equivalent thereof to undistort subsequently captured images.

9. The method of claim 1, wherein the basis for the warp and link functions comprises any of Legendre, Chebyshev, monomial, radial, or spline polynomials or a mixture thereof.

10. The method of claim 1, wherein the imaging system has an image detector selected from any of X ray detector, visible light camera, infrared camera, or ultrasound receiver.

11. The method of claim 1, wherein three or more horizontal lines and three or more vertical lines are used to provide dense line scan constraints with limited occlusion.

12. The method of claim 1, wherein robust loss functions are applied to at least one residual family to attenuate outliers or partial occlusions.

13. The method of claim 1, wherein scan lines and/or the gaps in the markers are used to fit an un-distortion model.

14. A system for calibrating geometric distortion in an imaging system comprising:

one or more processors, operatively coupled to the imaging system;

a memory, operatively coupled to the one or more processors, configured to store computer executable instructions that, when executed by the one or more processors, cause the one or more processors to perform a method comprising:

A) receiving calibration data comprising (i) a set of node correspondences between known reference coordinates and measured image coordinates, and (ii) line scan samples acquired along images of scene lines of known offset and orientation;

B) selecting a parametric two dimensional warp that maps reference coordinates to image coordinates and an auxiliary link function that relates v to (u,y) and u to (x,v);

C) forming an objective comprising node fit residuals, warp link coupling residuals, and link vs scan residuals; and D) optimizing the warp and link parameters to minimize the objective, thereby producing a calibrated distortion model.

15. A computer program product comprising a non-transitory computer-readable storage medium containing computer executable instructions that, when executed by one or more processors, cause a machine to perform a method comprising:

A) receiving calibration data comprising (i) a set of node correspondences between known reference coordinates and measured image coordinates, and (ii) line scan samples acquired along images of scene lines of known offset and orientation;

B) selecting a parametric two dimensional warp that maps reference coordinates to image coordinates and an auxiliary link function that relates v to (u,y) and u to (x,v);

C) forming an objective comprising node fit residuals, warp link coupling residuals, and link vs scan residuals; and D) optimizing the warp and link parameters to minimize the objective, thereby producing a calibrated distortion model.

16. The computer program product of claim 15, wherein the warp comprises bivariate polynomials of total degree three or higher.

17. The computer program product of claim 15, wherein the link functions comprise bivariate polynomials of total degree three or higher.

18. The computer program product of claim 15, wherein the node correspondences include gap centers and/or line intersections obtained from a calibration target.

19. The computer program product of claim 15, wherein D) enforces equality constraints requiring the link functions to interpolate node values.

20. The computer program product of claim 15, wherein D) comprises:

D1) affine seeding from nodes;

D2) linear least squares solving of link functions under node equality constraints;

D3) nonlinear warp recovery with links fixed; and

D4) joint nonlinear refinement.

21. The computer program product of claim 15, wherein line scan residuals are weighted with weights in proportion to quadrature and/or Voronoi area and/or an inverse variance factor.

22. The computer program product of claim 15, further comprising:

E) applying the calibrated warp or an inverse functional equivalent thereof to undistort subsequently captured images.

23. The computer program product of claim 15, wherein the basis for the warp and link functions comprises any of Legendre, Chebyshev, monomial, radial, or spline polynomials or a mixture thereof.

24. The computer program product of claim 15, wherein the imaging system has an image detector selected from any of X ray detector, visible light camera, infrared camera, or ultrasound receiver.

25. The computer program product of claim 15, wherein three or more horizontal lines and three or more vertical lines are used to provide dense line scan constraints with limited occlusion.

26. The computer program product of claim 15, wherein robust loss functions are applied to at least one residual family to attenuate outliers or partial occlusions.

27. The computer program product of claim 15, wherein scan lines and/or the gaps in the markers are used to fit an un-distortion model.

* * * * *